United States Patent [19]
Dockter

[11] Patent Number: 5,934,608
[45] Date of Patent: Aug. 10, 1999

[54] EFFICIENT BI-DIRECTIONAL AIR FLOW DEFLECTOR

[75] Inventor: Gregory E. Dockter, Mesa, Ariz.

[73] Assignee: McDonnell Douglas Helicopter Company, Mesa, Ariz.

[21] Appl. No.: 09/008,118

[22] Filed: Jan. 16, 1998

[51] Int. Cl.$^6$ ................................................ B64C 27/82
[52] U.S. Cl. .......................................... 244/17.19; 244/52
[58] Field of Search ............................. 244/17.19, 17.11, 244/52, 12.3, 12.4, 12.5, 23 D; 239/265.27

[56] References Cited

U.S. PATENT DOCUMENTS

| | | | |
|---|---|---|---|
| 2,964,905 | 12/1960 | Hewson et al. | 244/52 |
| 3,112,616 | 12/1963 | Adamson et al. | 244/52 |
| 3,351,304 | 11/1967 | Stein et al. | 244/17.19 |
| 3,752,417 | 8/1973 | Lagace | 244/52 |
| 3,807,662 | 4/1974 | Velazquez | 244/17.19 |
| 4,711,415 | 12/1987 | Binder | 244/17.19 |
| 5,232,183 | 8/1993 | Rumberger | 244/52 |

FOREIGN PATENT DOCUMENTS

| 1298518 | 6/1962 | France | 244/17.19 |
|---|---|---|---|

OTHER PUBLICATIONS

Grumm et al, "Advanced antitorque concepts study" USAAMRDL TR 71–23, pp. 100–101, Jul. 1971.

*Primary Examiner*—Galen L. Barefoot
*Attorney, Agent, or Firm*—Stout, Uxa, Buyan & Mullins, LLP

[57] ABSTRACT

The bi-directional air flow deflector of the present invention efficiently deflects air to the left opening and the right opening, and minimizes any vertical components of force which may be generated. The air flow vector exiting from each of the openings comprises a dominant horizontal force vector rather than a large component of force in the vertical direction. Vertical components of force may be added, if desired. The bi-directional air flow deflector provides reduced transmission torque requirements, and generally comprises a relatively small number of moving parts. A single moving part may be used to deflect air to either the left opening or the right opening, and this single moving part is not exposed to the outside environment and, accordingly, will generally provide reliable functionality. The bi-directional air flow deflector of the present invention is simple in design, comprises a small number of relatively easy to manufacture parts, and can be used to retrofit existing direct jet thrusters. The components of the bi-directional air flow deflector generally comprise relatively straight sides and surfaces, which require less sophisticated tooling and reduce costs. The reduced number of parts will require a smaller stock of parts for inventory and field support. The bi-directional air flow deflector can be assembled with generally less man power than prior art devices, and generally comprises an increased reliability. Since less energy is generally required to operate the bi-directional air flow deflector of the present invention, increased fuel efficiency can also be realized.

26 Claims, 9 Drawing Sheets

EFFICIENT BI-DIRECTIONAL AIR FLOW DEFLECTOR

BACKGROUND OF THE INVENTION

1. Field of the Invention

The present invention relates generally to air routing devices and, more particularly, to air routing devices for providing directional control to helicopters and other aircraft.

2. Description of Related Art

Figure 1:
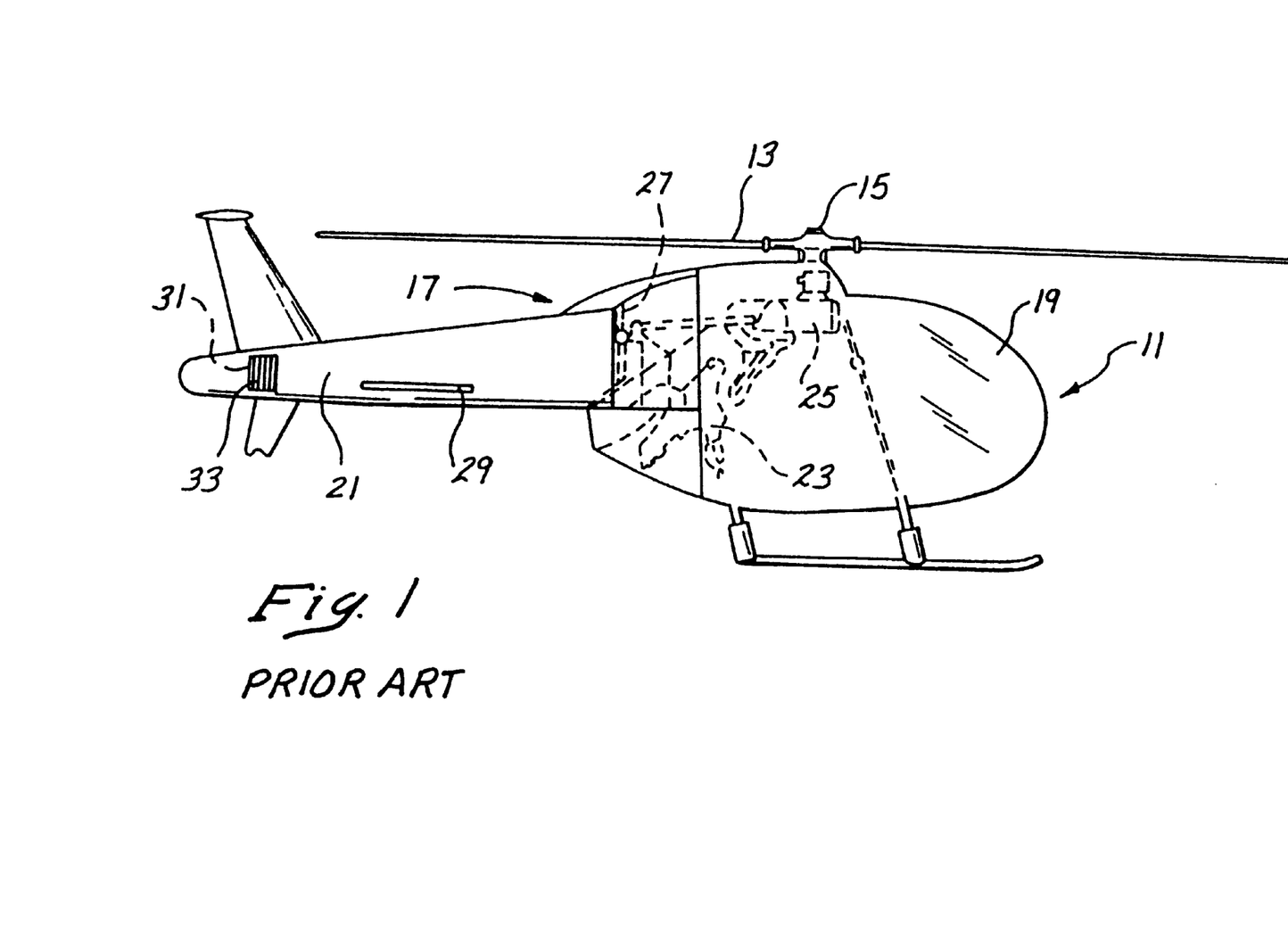
FIG. 1 illustrates a schematic side-elevational view of a conventional helicopter.

The helicopter 11 shown in FIG. 1 incorporates a direct jet thruster instead of a tail rotor. One prior art reference to Logan et al. (U.S. Pat. No. 4,200,252), issued on Apr. 29, 1980, discloses such a direct jet thruster, the contents of which are incorporated herein by reference. The helicopter 11 includes a main rotor 13, which rotates in a counterclockwise direction about the axis 15 to provide lift. A fuselage 17 is suspended beneath the main rotor 13. The fuselage 17 includes a cabin 19 for housing the pilot and other occupants, a tailboom 21, a main power plant 23, and a transmission 25.

In place of a tail rotor, the helicopter 11 uses a direct jet thruster, which comprises a left opening 31 and a right opening 33. A subsonic low-pressure-ratio fan 27 blows a stream of air into the tailboom 21. The compressed air in the tailboom 21 can be selectively discharged through either a circulation control slot 29 on the right side of the tailboom the left opening of the direct jet thruster 31, or the right opening of the direct jet thruster 33. Pressurized air from the subsonic low-pressure-ratio fan 27 is discharged through the circulation controlled tailboom slot 29 in order to counteract a torque generated by the counterclockwise rotation of the main rotor 13. This counterclockwise rotation of the main rotor 13 tends to push the tailboom 21 toward the right (out of the paper), and the discharged air through the circulation control tailboom slot 29 tends to push the tailboom 21 to the left. The net forces on the tailboom 21 from the main rotor 13 and the discharged air through the circulation control tailboom slot 29 are engineered to cancel each other out.

In addition to being utilized by the circulation control tailboom slot 29, the pressurized air from the subsonic low-pressure-ratio fan 27 can be utilized by the right opening 33 of the direct jet thruster to push the tailboom 21 to the left and cause the helicopter 11 to turn right. The pressurized air from the subsonic low-pressure-ratio fan 27 can similarly be discharged through the left opening 31 of the direct jet thruster in order to push the tailboom 21 to the right and cause the helicopter 11 to turn left. Only one of the left opening 31 and the right opening 33 of the direct jet thruster is open at any given time.

The pilot of the helicopter 11 controls the sizes of the left opening 31 and the right opening 33 of the direct jet thruster with a left foot rudder pedal and a right foot rudder pedal, respectively. When the left foot rudder pedal is completely depressed, the right opening 33 of the direct jet thruster is completely open, and when the right foot rudder pedal is completely depressed, the left opening 31 of the direct jet thruster is completely open. The left foot rudder pedal and the right foot rudder pedal move inversely to one another. Thus, when the left foot rudder pedal is completely depressed, the right foot rudder pedal is not depressed, and when the right foot rudder pedal is completely depressed, the left foot rudder pedal is not depressed.

A conventional air-flow controlling device for the direct jet thruster comprises an inner cylinder having a single opening disposed therein and an outer cylinder having two openings disposed therein. The two openings of the outer cylinder correspond to the left opening 31 and the right opening 33. The outer cylinder is fixed, but the inner cylinder is configured to rotate within the outer cylinder, to thereby move the single opening of the inner cylinder to align with either the left opening 31 or the right opening 33.

As the inner cylinder begins to open either the left opening 31 or the right opening 33, or alternatively, as the single opening in the inner cylinder begins to close either the left opening 31 or the right opening 33, a relatively large vertical component of air exits the aircraft through the respective opening. For example, the single opening in the inner cylinder may be rotated to initially partially open the right opening 33, in which case air from the subsonic low-pressure-ratio fan 27 exits through the right opening 33 in a somewhat vertical direction. As the single opening of the inner cylinder becomes more and more aligned with the right opening 33, the air exiting the right opening 33 develops more of a horizontal force component. This airflow deflecting device is relatively inefficient in providing crisp directional control to the helicopter 11, especially when high altitude hovering tasks are performed. The initial component of vertical force that occurs with each opening and closing of the left opening 31 and the right opening 33 can have a small negative impact on the handling qualities and stability of the helicopter 11. Additionally, relatively high transmission torque requirements exist with the present conventional device.

The relatively large number of moving parts and the nature and quality of many of these moving parts can be expensive to manufacture. For example, the two concentric cylinders should preferably operate with a low coefficient of friction under a fairly wide range of operating temperatures. Additionally, portions of the inner cylinder, the outer cylinder, and bearings between the inner cylinder and the outer cylinder are all exposed to the outdoor elements, which can reduce operating efficiency and increase maintenance costs.

SUMMARY OF THE INVENTION

The bi-directional air flow deflector of the present invention efficiently deflects air to the left opening and the right opening, and minimizes undesirable vertical components of force which may be generated. The air flow vector exiting from each of the openings comprises a dominant horizontal force vector rather than a large component of force in the vertical direction. Vertical components of force may be added, if desired. The bi-directional air flow deflector provides reduced transmission torque requirements, and generally comprises a relatively small number of moving parts. A single moving part may be used to deflect air to either the left opening or the right opening. This single moving part is not exposed to the outside environment and, accordingly, will generally provide reliable functionality. The bi-directional air flow deflector of the present invention is simple in design, comprises a small number of relatively easy to manufacture parts, and can be used to retrofit existing direct jet thrusters. The components of the bi-directional air flow deflector generally comprise relatively straight sides and surfaces, which require less sophisticated tooling and which can reduce manufacturing costs. The reduced number of parts will require a smaller stock of parts for inventory and field support. The bi-directional air flow deflector can be assembled with generally less man power than prior art devices, and can offer an increased reliability. Since less energy is generally required to operate the bi-directional air flow deflector of the present invention, increased fuel efficiency can also be realized.

According to one aspect of the present invention, an air flow deflector is disposed within a tailboom of a helicopter or a rotorcraft. The tailboom includes a forward end and an aft end, and further comprises a wall surrounding an interior volume. A left opening and a right opening are disposed within the wall. The air flow deflector includes a partition, a first plurality of air flow veins, a second plurality of air flow veins, and at least one moveable member disposed near the forward end of the interior volume. The partition is connection to the tailboom near the aft end of the tailboom, and divides the interior volume into a first chamber and a second chamber. The left opening is disposed within the first chamber and the right opening is disposed within the second chamber. The first plurality of air flow veins is disposed within the first chamber, and the second plurality of air flow veins in disposed within the second chamber. The moveable member is moveable between a first position wherein an air passageway is formed from the forward end to the first plurality of air flow veins within the first chamber and out of the left opening, and a second position wherein an air passageway is formed from the forward end of the second plurality of air flow veins within the second chamber and out of the right opening. In one aspect of the present invention, the first chamber and the second chamber are vertically disposed relative to one another, and in another aspect of the present invention, the first chamber and the second chamber are horizontally disposed relative to one another.

The partition, which divides the interior volume into a first chamber and a second chamber, comprises a planar member. Both the first plurality of air flow veins and the second plurality of air flow veins are connected to the tailboom. Each air flow vein of the first plurality of air flow veins comprises a curved surface for deflecting air from the forward end of the tailboom out of the left opening, and each air flow vein of the second plurality of air flow veins comprises a curved surface for deflecting air from the forward end of the tailboom out of the right opening. An axis of the tailboom is defined as the shortest distance between the forward end of the tailboom and the aft end of the tailboom, and each curved surface of each air flow vein of both the first plurality of air flow veins and the second plurality of air flow veins comprises a center point. A first line passing through the center points of the curved surfaces of the first plurality of air flow veins forms about a 45 degree angle with the axis of the tailboom, and a second line passing through the center points of the curved surfaces of the second plurality of air flow veins forms about a 45 degree angle with the axis of the tailboom. The first line is substantially perpendicular to the second line.

In one aspect of the present invention, the at least one moveable member comprises a sliding door adapted to slide along an axis which is substantially perpendicular to the axis of the tailboom. The sliding door blocks air from flowing into the second chamber when the sliding door is in the first position, and the sliding door blocks air from flowing into the first chamber when the sliding door is in the second position.

In another aspect of the present invention, the moveable member comprises a flapper valve having a moveable forward flapper valve end and a stationary aft flapper valve end. The flapper valve is adapted to move about the stationary aft flapper valve end. The flapper valve blocks air from flowing into the second chamber when the flapper valve is in the first position, and the flapper valve blocks air from flowing into the first chamber when the flapper valve is in the second position.

In another aspect of the present invention, the moveable member comprises at least one butterfly valve disposed at a forward end of the first and second chambers. The butterfly valve blocks air from flowing into the second chamber when the butterfly valve is in the first position, and the butterfly valve blocks air from flowing into the first chamber when the butterfly valve is in the second position. In yet another aspect of the present invention, the moveable member comprises a rotating door disposed at a forward end of the first and second chambers.

According to another aspect of the present invention, an air deflector is disposed within a helicopter tailboom having a forward portion and an aft portion. The air deflector includes a partition dividing the aft portion of the helicopter tailboom into an upper chamber having a left opening and a lower chamber having a right opening. The left opening fluidly connects the upper chamber to an ambient atmosphere, and the right opening fluidly connects the lower chamber to an ambient atmosphere. The air deflector further includes at least one moveable member disposed within the forward portion of the tailboom. The moveable member is moveable between a first position wherein an air passageway is formed from the forward portion of the tailboom to the upper chamber and out of the left opening, and a second position wherein an air passageway is formed from the forward portion of the tailboom into the lower chamber and out of the right opening. In another aspect of the present, invention, the partition divides the aft portion of the helicopter tailboom into a lower chamber having a left opening and an upper chamber having a right opening. The left opening fluidly connects the lower chamber to an ambient atmosphere, and the right opening fluidly connects the upper chamber to an ambient atmosphere.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Figures 2A, 2B:
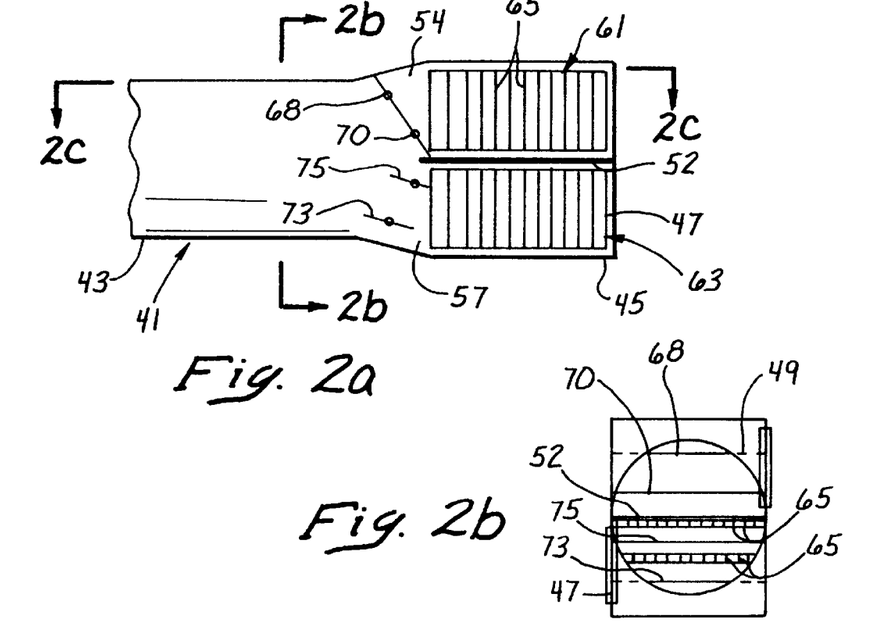
FIG. 2a–2d illustrate various views of a helicopter tailboom having four butterfly valves and vertically displaced chambers.
Figure 2C:
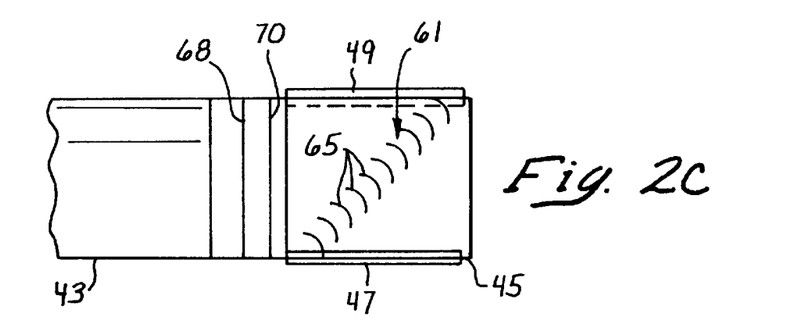
Figure 2D:
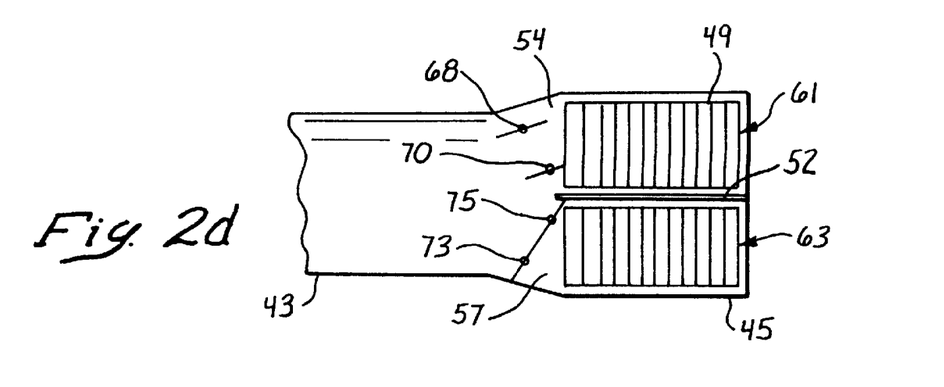

FIGS. 2a–2d illustrate various views of a tailboom 41 of a helicopter or rotorcraft. The tailboom 41 comprises a forward portion 43 and an aft portion 45. The left cross-sectional view of FIG. 2a is shown in a direction from the left side of the helicopter or rotorcraft looking toward the right side of the helicopter or rotorcraft. A right opening 47 connects an interior volume of the tailboom 41 to an ambient atmosphere. The left opening 49 is illustrated in the aft cross-sectional view of FIG. 2b, along with the right opening 47. A partition 52 divides the aft portion 45 into a first chamber 54 and a second chamber 57. The first chamber 54 and the second chamber 57 are vertically disposed, relative to one another. A first plurality of air flow vanes 61 is disposed in the first chamber 54, and a second plurality of air flow vanes 63 is disposed in the second chamber 57. As illustrated in top cross-sectional view of FIG. 2c, the first plurality of air flow vanes 61, for example, operate to receive air from a subsonic low-pressure-ratio fan (not shown) and to efficiently deflect the air out of the left opening 49. In the presently preferred embodiment, a line passing through the center points of each of the reflectors 65 of the first plurality of reflectors 61 forms a 45 degree angle with a line along a longitudinal axis of the tailboom 41. The curvature of each of the reflectors 65, and the orientation of the reflectors 65 relative to one another, provides for efficient deflection of air from the forward portion 43 of the tailboom 41 out of the left opening 49, for example. FIG. 2d illustrates a right cross-sectional view of the tailboom 41 in a configuration where air is routed out of the left opening 49. The left opening 49 can be seen receiving air in the right cross-sectional view of FIG. 2d.

A first butterfly valve 68 and a second butterfly valve 70 are disposed at a forward end of the first chamber 54, and a third butterfly valve 73 and fourth butterfly valve 75 are disposed at a forward end of the second chamber 57. The first butterfly valve 68 and the second butterfly valve 70 are configured to block the passage of air from the forward portion 43 to the first chamber 54 to thereby impede the flow of air out of the left opening 49. As shown in FIG. 2d, the first butterfly valve 68 and the second butterfly valve 70 can be placed in an open configuration to allow air to flow from the forward portion 43 into the first chamber 54 and, subsequently, out of the left opening 49. Similarly, the third butterfly valve 73 and the fourth butterfly valve 75 can be placed in an open configuration, as illustrated in FIG. 2a, and can also be placed in a closed configuration, as illustrated in FIG. 2d.

The first butterfly valve 68 and the second butterfly valve 70 are placed in a closed configuration, and the third butterfly valve 73 and the fourth butterfly valve 75 are placed in an open configuration, to thereby route air from the forward portion 43 into the second chamber 57 and, subsequently, out of the right opening 47. Similarly, as illustrated in FIG. 2d, the first butterfly valve 68 and the second butterfly valve 70 are placed in an open configuration, and the third butterfly valve 73 and the fourth butterfly valve 75 are placed in a closed configuration, to thereby facilitate the passage of air from the forward portion 43 into the first chamber 54 and, subsequently, out of the left opening 49. The aft cross-sectional view of FIG. 2b is taken along the line 2b—2b of FIG. 2a, and the top cross-sectional view of FIG. 2c is taken along the line 2c—2c of FIG. 2a. The aft cross-sectional view of FIG. 2b illustrates how the closed configuration of the first butterfly valve 68 and the second butterfly valve 70 serves to prevent the passage of air into the first chamber 54, while also deflecting air from the forward portion 43 in a direction toward the second chamber 57. Air contacting the third butterfly valve 73 and the fourth butterfly valve 75 is deflected in a general direction into the second chamber 57, toward the second plurality of airflow veins 63, and out of the right opening 47.

The first, second, third, and fourth butterfly valves 68, 70, 73, 75, respectively, are preferably controlled by foot pedals (not shown) within the helicopter or rotorcraft pilot cockpit. The center portion of each butterfly valve operates as a rotational axis of the respective butterfly valve, and the outer end or ends of each butterfly valve is controlled by mechanical attachments (not shown) which are operatively connected to the foot pedals (not shown) within the helicopter cockpit. The first and second butterfly valves 68, 70, and the second and third butterfly valves 73, 75, are sized and configured to completely close off the air flow from going in one direction and diverting all of the air in another direction. The length of the butterfly valves 68, 70, 63, 75 and the shape of the tailboom 41, right opening 47, and left opening 49, can be configured to provide a desired transition of air flow in a direction from the forward portion 43 to the aft portion 45. Additionally, these and other physical characteristics can be adjusted to minimize air turbulence in the aft portion 45 of the tailboom 41.

Figure 3A:
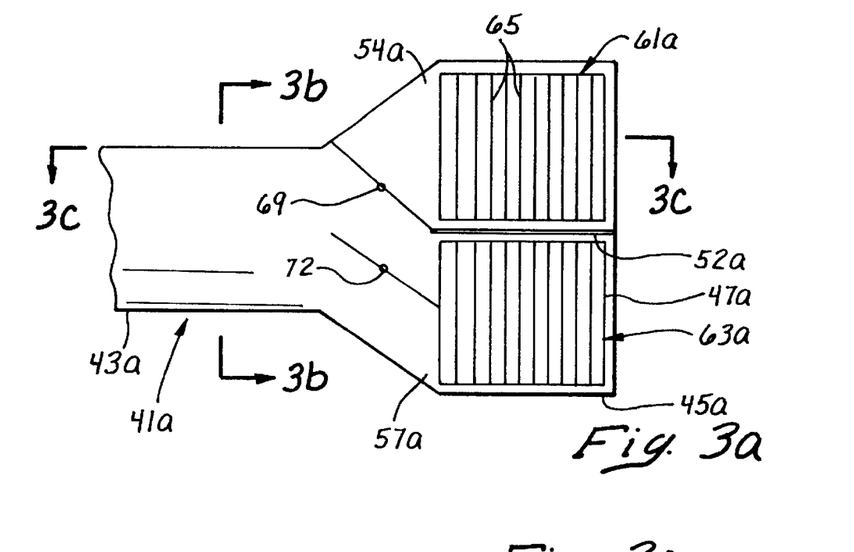
FIGS. 3a–3d illustrate various views a helicopter tailboom having two butterfly valves and vertically displaced chambers.
Figures 3B, 3C, 3D:
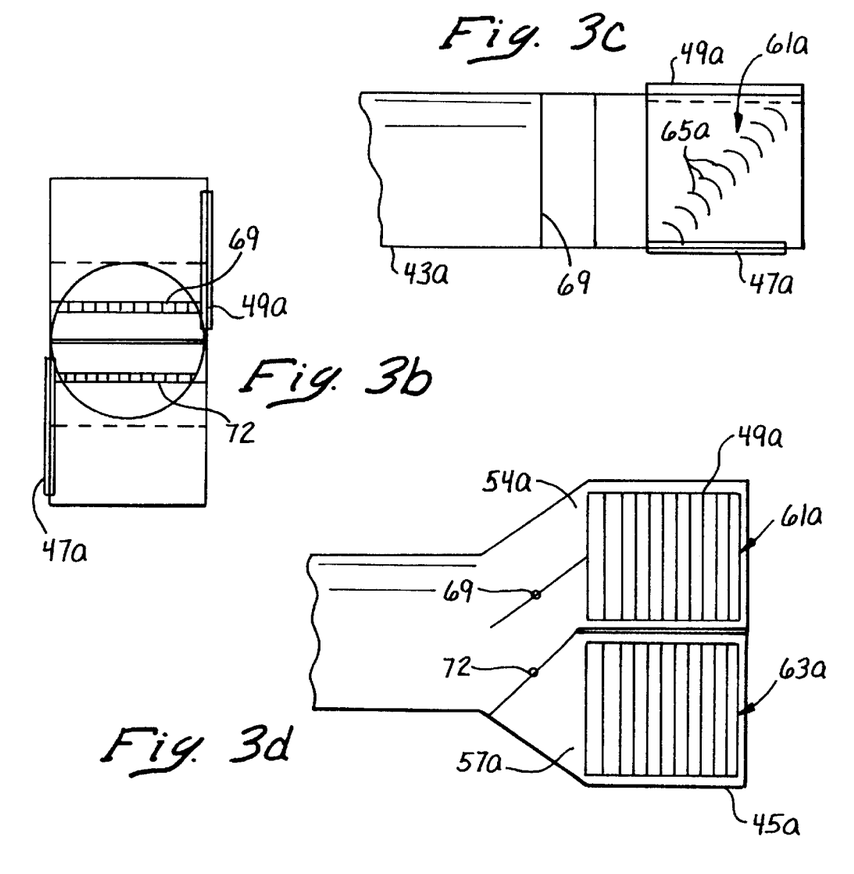

FIGS. 3a–3d illustrate various views of a helicopter tailboom having two vertically disposed chambers. In FIGS. 3a–3d, elements similar to the elements of FIGS. 2a–2d are denoted with like reference numerals followed by the letter "a." FIG. 3a illustrates a left cross-sectional view of a tailboom 41a, and FIG. 3b illustrates an aft cross-sectional view of the tailboom 41a taken along the line 3b—3b of FIG. 3a. FIG. 3c illustrates a cross-sectional view taken along the line 3c—3c of FIG. 3a, and FIG. 3d illustrates a right cross-sectional view of the tailboom 41a. A first butterfly valve 69 is disposed at a forward end of the first chamber 54a, and a second butterfly valve 72 is disposed at a forward end of the second chamber 57a. The first butterfly valve 69 and the second butterfly valve 72 move together, to either close off the first chamber 54a and open the second chamber 57a, or to close off the second chamber 57a and open the first chamber 54a.

Figure 4A:
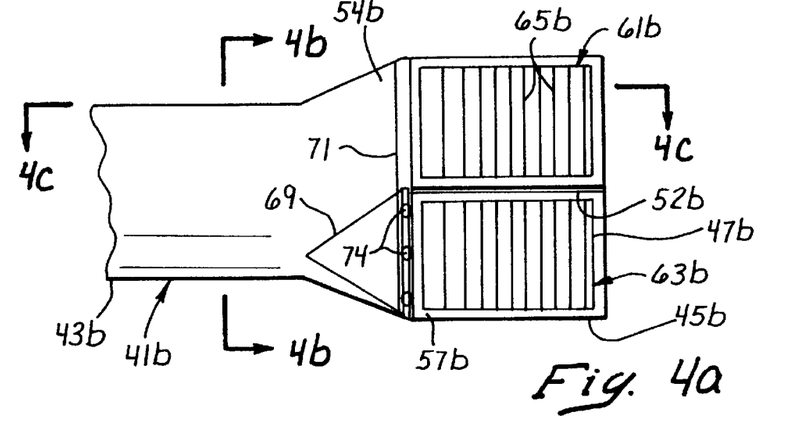
FIGS. 4a–4d illustrate various views of a helicopter tailboom having a sliding door and vertically displaced chambers.
Figure 4B:
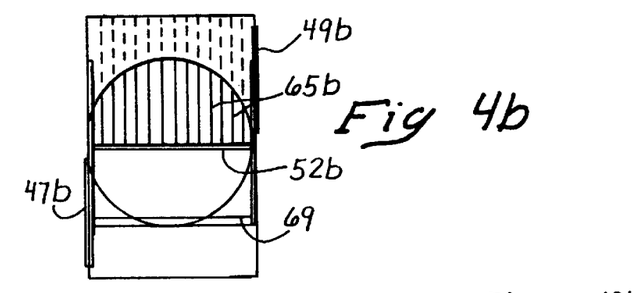
Figure 4C:
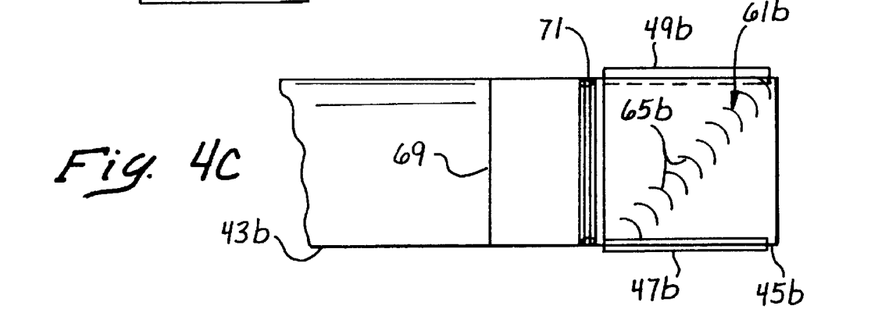
Figure 4D:
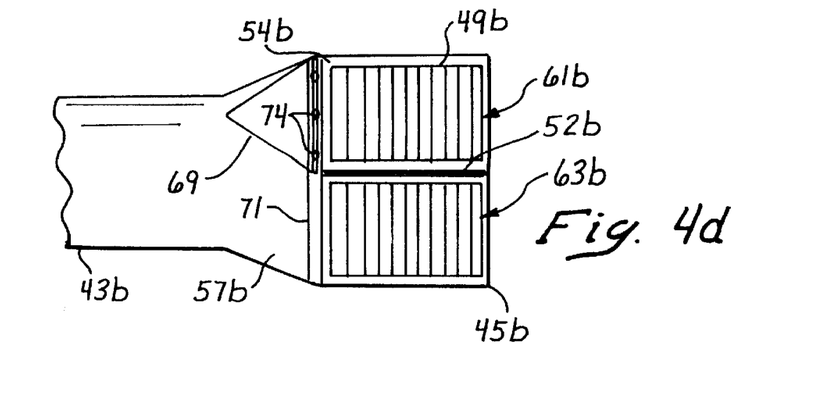

FIGS. 4a–4d illustrate various views of a helicopter tailboom. In FIGS. 4a–4d, elements similar to the elements of FIGS. 2a–2d are designated with like reference numerals followed by the letter "b." FIG. 4a illustrates a left cross-sectional view of a tailboom 41b, and FIG. 4b illustrates an aft cross-sectional view of the tailboom 41b taken along the line 4b—4b of FIG. 4a. FIG. 4c illustrates a cross-sectional view taken along the line 4c—4c of FIG. 4a, and FIG. 4d illustrates a right cross-sectional view of the tailboom 41b. A sliding door 69 is disposed along a track 71. The sliding door 69 preferably comprises a plurality of wheels 74 for facilitating movement of the sliding door 69 along the track 71. The sliding door 69 serves to block passage to one of the air chambers 54, 57 and to facilitate passage of air into the other of the air chambers 54, 57. The triangular shape of the door 69 facilitates efficient deflection and routing of air during transitional movement of the door 69 between the two chambers 54, 57 and, also, during non-transitional operation of the sliding door 69. Although a triangular shape is preferred for the sliding door 69, other shapes, such as a planar shape, for example, may also be used in accordance with the present invention.

Figure 5A:
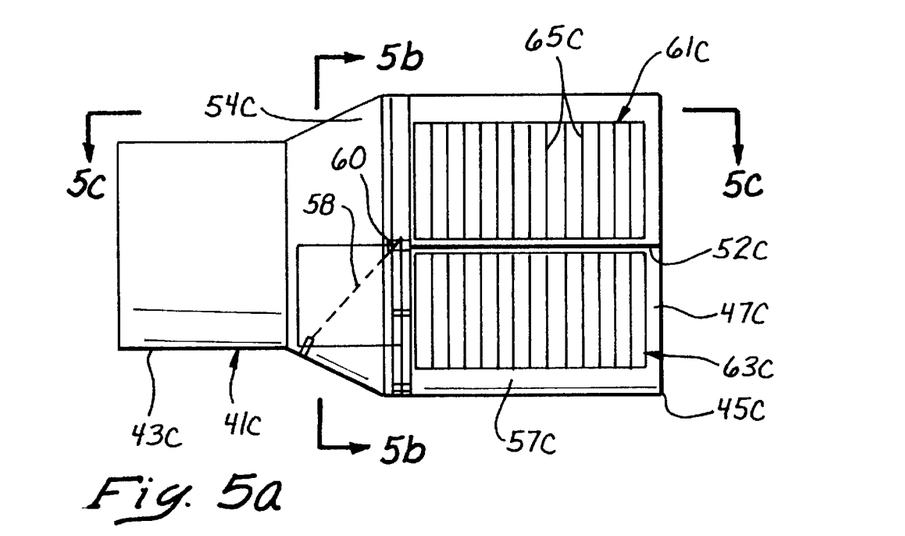
FIGS. 5a–5c illustrate various views of a helicopter tailboom having a rotating semi-cylinder and vertically displaced chambers.
Figure 5B:
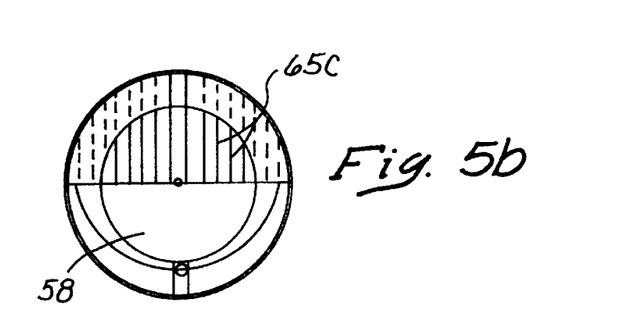
Figure 5C:
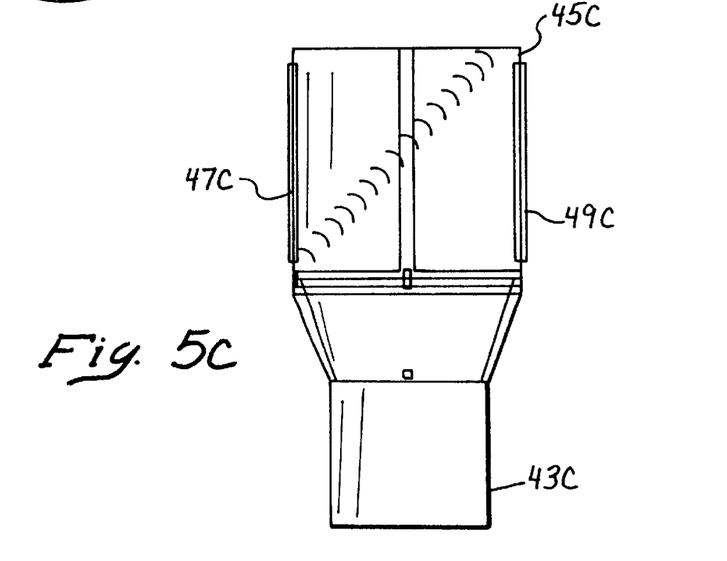

FIGS. 5a–5c generally correspond to FIGS. 2a–2c. In FIGS. 5a–5c, similar elements to those of FIGS. 2a–2c are denoted with similar reference numerals followed by the letter "c." FIG. 5a illustrates a left cross-sectional view of a helicopter tailboom 41c. FIG. 5b illustrates an aft cross-sectional view of the helicopter tailboom 41c taken along the line 5b—5b of FIG. 5a, and FIG. 5c illustrates a cross-sectional view of the helicopter tailboom 41c taken along the line 5c—5c of FIG. 5a. A semi-cylindrical door 58 is mounted on a rotational axis 60. The semi-cylindrical door 58 rotates about the rotational axis 60 to either block access to the first chamber 54c and deflect air into the second chamber 57c, or to block access to the second chamber 57c and deflect air into the first chamber 54c. In FIG. 5b, the semi-cylindrical door 58 is shown blocking access to the second chamber 57c. Rotation of the semi-cylindrical door 58 180 degrees about the rotational axis 60 will orientate the semi-cylindrical door 58 to block access to the first chamber 54c.

Figure 6A:
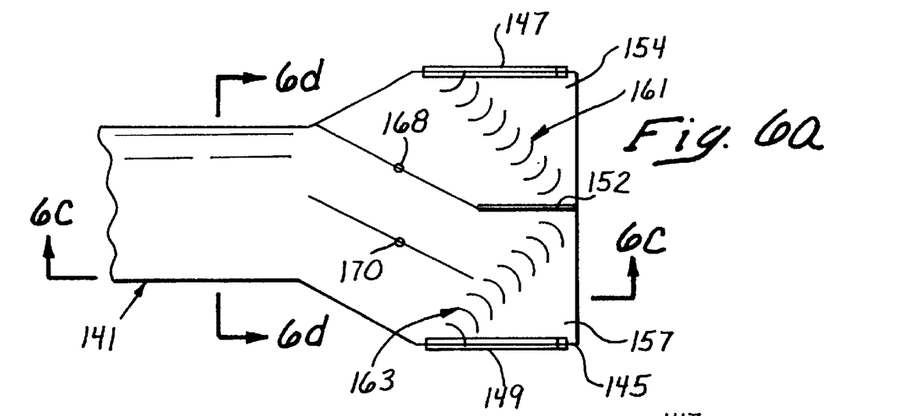
FIGS. 6a–6d illustrate various views of a helicopter tailboom having two buttery valves and horizontally displaced chambers.
Figure 6B:
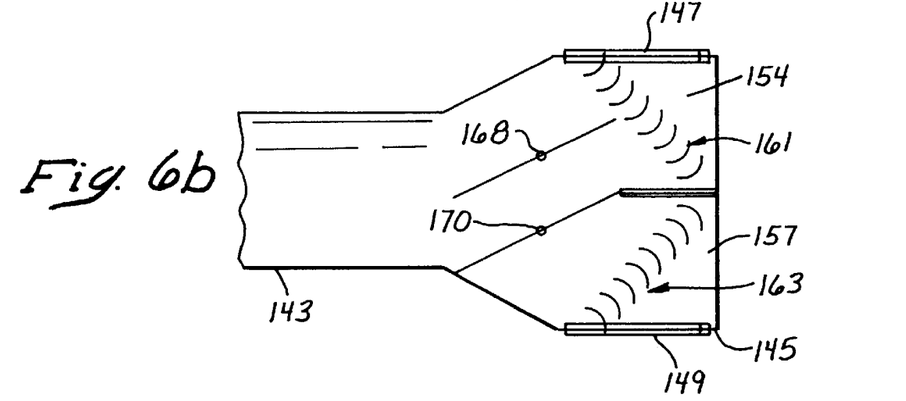
Figure 6C:
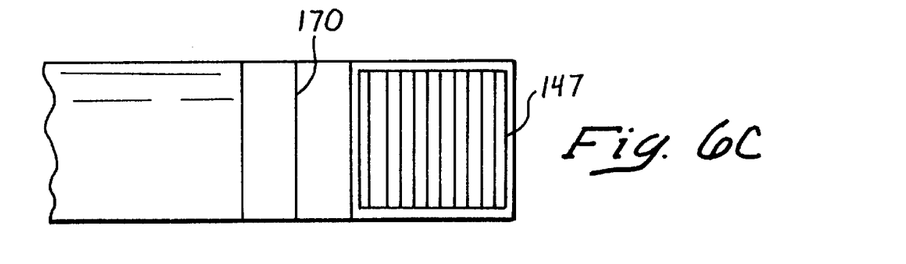
Figure 6D:
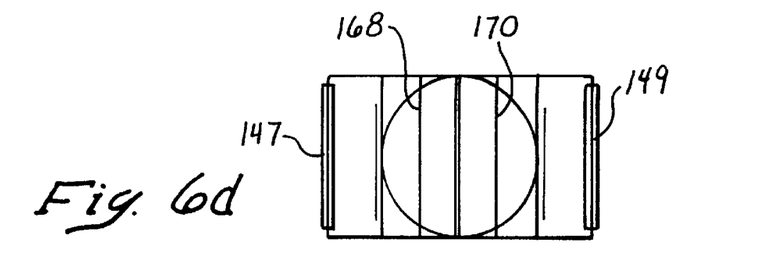
Figure 7A:
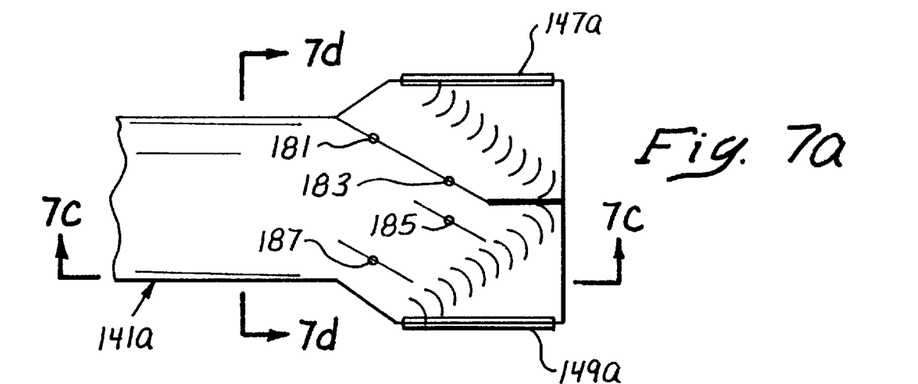
FIGS. 7a–7d illustrate various views of a helicopter tailboom having four butterfly valves and horizontally displaced chambers.
Figure 7B:
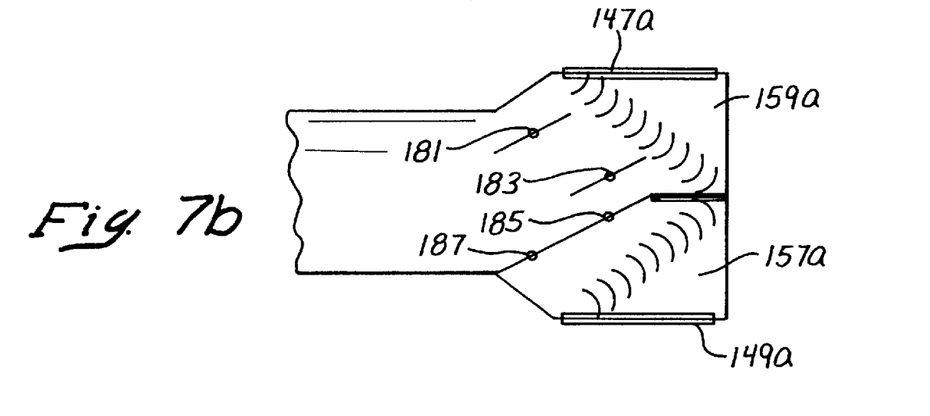
Figure 7C:
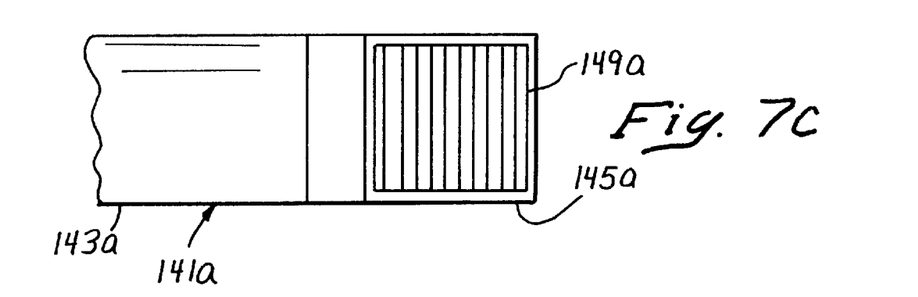
Figure 7D:
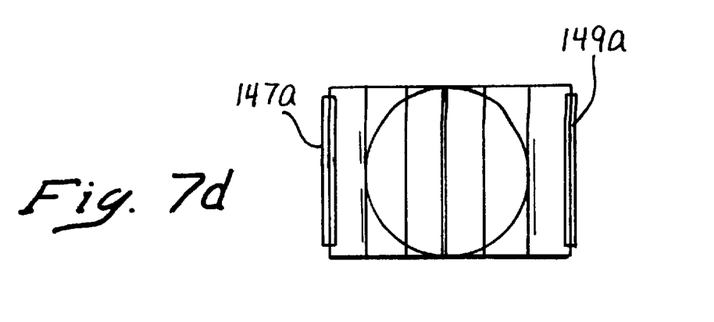
Figure 8A:
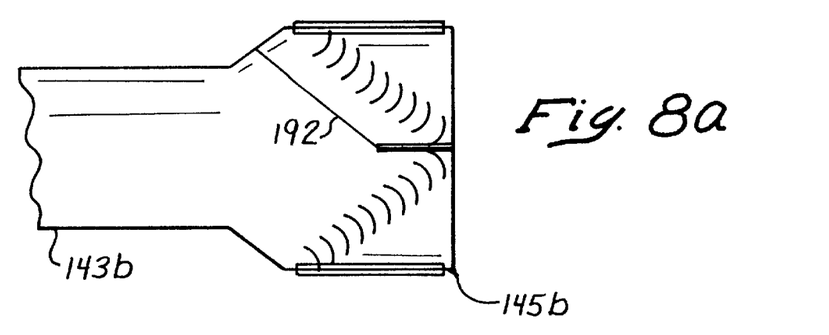
FIGS. 8a–8d illustrate a helicopter tailboom having a single flapper valve and horizontally displaced chambers.
Figure 8B:
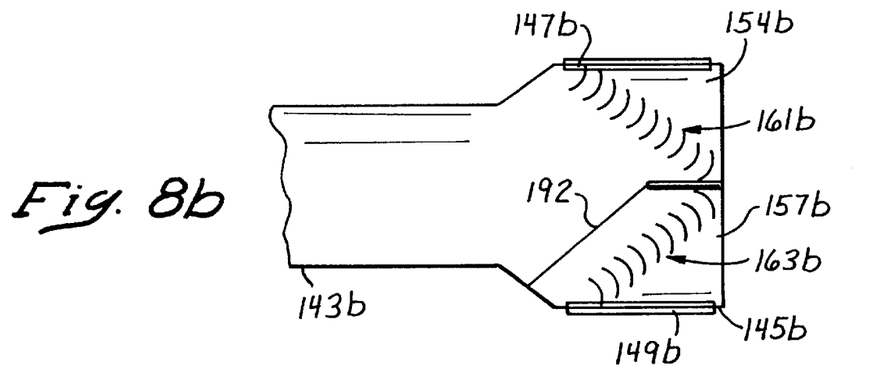
Figure 8C:
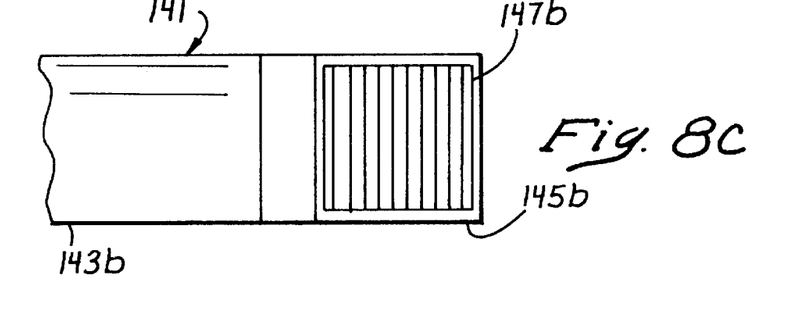
Figure 8D:
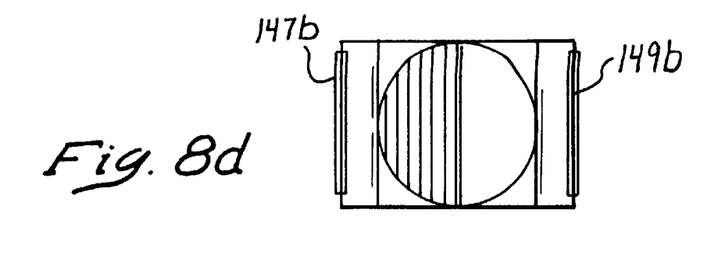

FIGS. 6a–6d illustrate a tailboom 141 having a forward portion 143 and an aft portion 145. A right opening 147 and a left opening 149 are disposed on opposing sides of the aft portion 145 of the tailboom 141. A partition 152 divides the aft portion 145 of the tailboom 141 into a first chamber 154 and a second chamber 157. A first plurality of air flow veins 161 is disposed within the first chamber 154, and a second plurality of air flow vanes 163 is disposed within the second chamber 157. A first butterfly valve 168 controls the flow of air into the first chamber 154, and a second butterfly valve 170 controls the flow of air into the second chamber 157. The bottom cross-sectional view shown in FIG. 6a illustrates a configuration of the first and second butterfly valves 168, 170 for deflecting air into the second chamber 157, and the bottom cross-sectional view of FIG. 6b illustrates a configuration of the first and second butterfly valves 168, 170 for deflecting air into the first chamber 154. FIG. 6c illustrates a right cross-sectional view taken along the line 6c—6c of FIG. 4a, and FIG. 6d is an aft cross-sectional view taken along the line 6d—6d of FIG. 6a. FIGS. 7a–7d illustrate an embodiment similar to the embodiment of FIGS. 6a–6d, with the first and second butterfly valves 168, 170 replaced with first, second, third, and fourth butterfly valves 181, 183, 185, 187. Like elements in FIGS. 7a–7d which are similar to elements in FIGS. 6a–6d are designated with like reference numerals followed by the letter "a." FIG. 7a illustrates a configuration where air is deflected into the left opening 149a, and FIG. 7b illustrates a configuration where air is deflected into the right opening 147a. FIG. 7c illustrates a cross-sectional view taken along the line 7c—7c of FIG. 7a, and FIG. 7d illustrates an aft cross-sectional view taken along the line 7d—7d of FIG. 7a.

FIGS. 8a–8d illustrate an embodiment similar to the embodiment of FIGS. 6a–6d. A single flapper valve 192 is used instead of the first butterfly valve 168 and the second butterfly valve 170. In FIGS. 8a–8d similar elements are designated with like reference numerals followed by the letter "b."

Figure 9A:
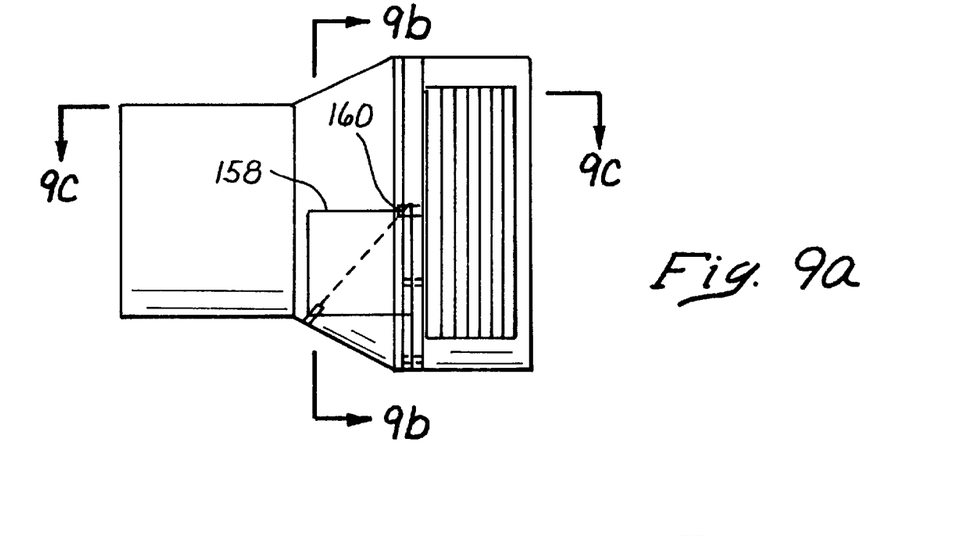
FIGS. 9a–9c illustrate a helicopter tailboom having a rotating semi-cylinder and horizontally displaced chambers.
Figure 9B:
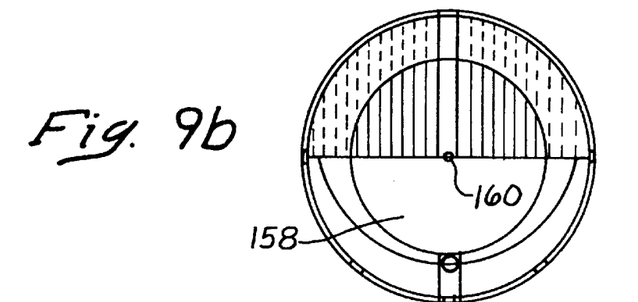
Figure 9C:
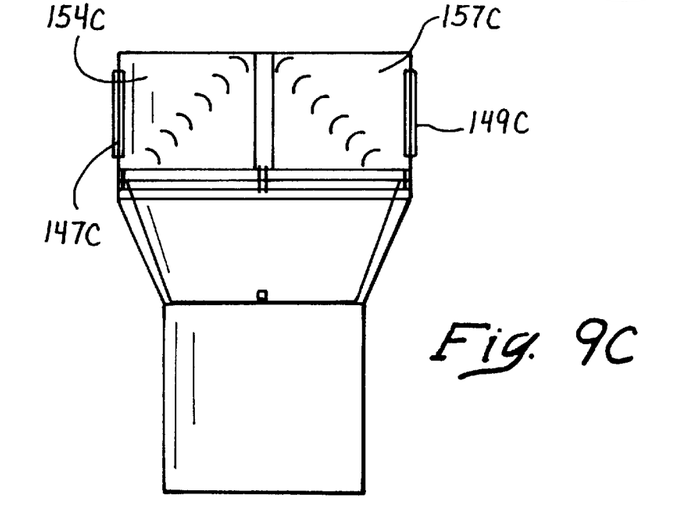

FIGS. 9a–9c generally correspond to FIGS. 6a, 6b, and 6d. In FIGS. 9a–19c, similar elements are designated with like reference numerals followed by the letter "c." A semi-cylindrical door 158 rotates about a rotational axis 160 to selectively provide a fluid-flow path between the forward portion of the tailboom and either the right opening 147c or the left opening 149c. FIG. 9a is a left cross-sectional view of the tailboom 141c, with the semi-cylindrical door 158 shown in a transitional position. The semi-cylindrical door 158 in FIG. 9a partially blocks the first chamber 154c and the second chamber 157c.

The above-described flapper valves, butterfly valves, sliding doors, and semi-cylindrical doors are preferably completely contained within the tailboom and, accordingly, are not significantly affected by rain, snow, hail, wind, flying debris, and tampering. Each of these moving means for directing an airflow through either the left opening or the right opening of a tailboom is preferably controlled by foot pedals (not shown) which are operated by a pilot. The various above-described embodiments of the present invention do not require mechanisms for directly opening and closing the right and left openings of the direct jet thruster. The mechanical reliability of the present invention can be enhanced, relative to prior art systems.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

I claim:

1. An airflow deflector disposed within a tailboom of a helicopter or rotorcraft, the tailboom having a forward end and an aft end, the tailboom comprising a wall surrounding an interior volume, a left opening disposed in the wall, and a right opening disposed in the wall, the airflow deflector comprising:

a partition connected to the tailboom near the aft end of the tailboom, the partition dividing the interior volume into a first chamber and a second chamber, wherein the left opening is disposed within the first chamber and wherein the right opening is disposed within the second chamber;

a first plurality of airflow vanes disposed within the first chamber;

a second plurality of airflow vanes disposed within the second chamber; and at least one movable member disposed near the forward end of the interior volume, the movable member being movable between a first position wherein an air passageway is formed from the forward end to the first plurality of airflow vanes within the first chamber and out of the left opening, and a second position wherein an air passageway is formed from the forward end to the second plurality of airflow vanes within the second chamber and out of the right opening.

2. The airflow deflector as recited in claim 1, wherein the first chamber and the second chamber are vertically disposed relative to one another.

3. The airflow deflector as recited in claim 1, wherein the first chamber and the second chamber are horizontally disposed relative to one another.

4. The airflow deflector as recited in claim 1, wherein the partition comprises a planar member.

5. The airflow deflector as recited in claim 1, wherein:

the first plurality of airflow vanes is connected to the tailboom; and the second plurality of airflow vanes is connected to the tailboom.

6. The airflow deflector as recited in claim 5, wherein:

each airflow vane of the first plurality of airflow vanes is connected to the tailboom; and each airflow vane of the second plurality of airflow vanes is connected to the tailboom.

7. The airflow deflector as recited in claim 6, wherein:

each airflow vane of the first plurality of airflow vanes comprises a curved surface for deflecting air from the forward end of the tailboom out of the left opening; and each airflow vane of the second plurality of airflow vanes comprises a curved surface for deflecting air from the forward end of the tailboom out of the right opening.

8. The airflow deflector as recited in claim 7, wherein:

an axis of the tailboom is defined as a shortest distance between the forward end of the tailboom and the aft end of the tailboom;

each curved surface of each airflow vane of the first plurality of airflow vanes comprises a center point;

each curved surface of each airflow vane of the second plurality of airflow vanes comprises a center point;

a first line passing through the center points of the curved surfaces of the first plurality of airflow vanes forms about a 45 degree angle with the axis of the tailboom; and a second line passing through the center points of the curved surfaces of the second plurality of airflow vanes forms about a 45 degree angle with the axis of the tailboom.

9. The airflow deflector as recited in claim 8, wherein:

the first line is substantially perpendicular to the second line.

10. The airflow deflector as recited in claim 1, wherein:

an axis of the tailboom is defined as a shortest distance between the forward end of the tailboom and the aft end of the tailboom; and the at least one movable member comprises a sliding door adapted to slide along an axis which is substantially perpendicular to the axis of the tailboom.

11. The airflow deflector as recited in claim 10, wherein:

the sliding door blocks air from flowing into the second chamber when the sliding door is in the first position; and the sliding door blocks air from flowing into the first chamber when the sliding door is in the second position.

12. The airflow deflector as recited in claim 1, wherein the at least one movable member comprises a flapper valve having a movable forward flapper valve end and a stationary aft flapper valve end, the flapper valve being adapted to move about the stationary aft flapper valve end.

13. The airflow deflector as recited in claim 12, wherein:

the flapper valve blocks air from flowing into the second chamber when the flapper valve is in the first position; and the flapper valve blocks air from flowing into the first chamber when the flapper valve is in the second position.

14. The airflow deflector as recited in claim 1, wherein the at least one movable member comprises at least one butterfly valve disposed at a forward end of each of the first chamber and the second chamber.

15. The airflow deflector as recited in claim 14, wherein:

the at least one butterfly valve disposed at a forward end of the second chamber blocks air from flowing into the second chamber when the movable member is in the first position; and the at least one butterfly valve disposed at a forward end of the first chamber blocks air from flowing into the first chamber when the movable member is in the second position.

16. The airflow deflector as recited in claim 1, wherein the at least one movable member comprises a rotating door disposed at a forward end of the first chamber and the second chamber.

17. An air-deflector disposed within a helicopter tailboom, the helicopter tailboom having a forward portion and an aft portion, the air-deflector comprising:

a partition dividing the aft portion of the helicopter tailboom into an upper chamber having a left opening disposed therein and a lower chamber having a right opening disposed therein, the left opening fluidly connecting the upper chamber to an ambient atmosphere and the right opening fluidly connecting the lower chamber to an ambient atmosphere; and at least one movable member disposed within the forward portion of the tailboom, the movable member being movable between a first position wherein an air passageway is formed from the forward portion of the tailboom to the upper chamber and out of the left opening, and a second position wherein an air passageway is formed from the forward portion of the tailboom to the lower chamber and out of the right opening.

18. The air-deflector as recited in claim 17, wherein the air-deflector further comprises:

a first plurality of airflow vanes disposed within the upper chamber; and a second plurality of airflow vanes disposed within the lower chamber.

19. The air deflector as recited in claim 18, wherein the air deflector further comprises at least one movable member disposed within the forward portion of the tailboom, the movable member being movable between a first position wherein an air passageway is formed from the forward portion of the tailboom to the first plurality of airflow vanes within the upper chamber and out of the left opening, and a second position wherein an air passageway is formed from the forward portion of the tailboom to the second plurality of airflow vanes within the lower chamber and out of the right opening.

20. The airflow deflector as recited in claim 19, wherein:

an axis of the tailboom is defined as a shortest distance between the forward portion of the tailboom and the aft portion of the tailboom; and the at least one movable member comprises a sliding door adapted to slide along an axis which is substantially perpendicular to the axis of the tailboom.

21. The airflow deflector as recited in claim 19, wherein the at least one movable member comprises a flapper valve having a movable forward flapper valve end and a stationary aft flapper valve end, the flapper valve being adapted to move about the stationary aft flapper valve end.

22. The airflow deflector as recited in claim 19, wherein the at least one movable member comprises at least one butterfly valve disposed at a forward end of each of the second chamber and the first chamber.

23. The airflow deflector as recited in claim 19, wherein the at least one movable member comprises a rotating door disposed at a forward end of the second chamber and the first chamber.

24. An air-deflector disposed within a helicopter tailboom, the helicopter tailboom having a forward portion and an aft portion, the air-deflector comprising:

a partition dividing the aft portion of the helicopter tailboom into a lower chamber having a left opening disposed therein and an upper chamber having a right opening disposed therein, the left opening fluidly connecting the lower chamber to an ambient atmosphere and the right opening fluidly connecting the upper chamber to an ambient atmosphere; and at least one movable member disposed within the forward portion of the tailboom, the movable member being movable between a first position wherein an air passageway is formed from the forward portion of the tailboom to the lower chamber and out of the left opening, and a second position wherein an air passageway is formed from the forward portion of the tailboom to the upper chamber and out of the right opening.

25. The air-deflector as recited in claim 24, wherein the air-deflector further comprises:

a first plurality of airflow vanes disposed within the lower chamber; and a second plurality of airflow vanes disposed within the upper chamber.

26. The air deflector as recited in claim 25, wherein the air deflector further comprises at least one movable member disposed within the forward portion of the tailboom, the movable member being movable between a first position wherein an air passageway is formed from the forward portion of the tailboom to the first plurality of airflow vanes within the lower chamber and out of the left opening, and a second position wherein an air passageway is formed from the forward portion of the tailboom to the second plurality of airflow vanes within the upper chamber and out of the right opening.

* * * * *